United States Patent Office 2,847,410
Patented Aug. 12, 1958

2,847,410

METHOD FOR POLYMERIZING VINYL CHLORIDE

Beryl M. Kuhn and Walter J. Zybert, Morristown, N. J., assignors to Allied Chemical Corporation, a corporation of New York No Drawing. Application February 16, 1954
Serial No. 410,704

4 Claims. (Cl. 260—92.8)

This invention relates to a method for polymerizing polyvinyl chloride by a suspension polymerization procedure to produce a polyvinyl chloride which is readily mixed with plasticizers and, when the plasticized polymer is fused and made into formed articles by molding or sheeting, gives products of better quality than are obtained from polyvinyl chlorides prepared by the conventional suspension polymerization procedures. The invention includes the preparation of the plasticized polyvinyl chloride and formed products made therefrom.

Various methods are known for polymerizing vinyl chloride, including those in which the monomeric material is polymerized while dispersed in the form of small or fine droplets in an aqueous medium containing a catalyst. Two types of polymerization procedures with the vinyl chloride dispersed in an aqueous medium are well recognized in the art. In one the monomer is finely dispersed or emulsified in a reaction mixture containing an emulsifying agent. This emulsion type of procedure gives an emulsion of the polyvinyl chloride which is stable, or at least requires very long periods of time for solid polymer to separate from aqueous mother liquor without specific treatments to agglomerate the polymer particles or induce their separation from the liquid. A second well recognized procedure involves polymerizing the vinyl chloride dispersed in an aqueous medium which may contain a stabilizing colloidal material. These suspension polymerization methods are characterized by forming larger particles of polyvinyl chloride which, without special treatment to agglomerate them, may be filtered from, or in a relatively short time separate by sedimentation from aqueous phase.

The conventional methods heretofore employed for suspension polymerization of vinyl chloride give a product which consists of relatively dense, hard granules. When mixed with a plasticizer these granules form a wet or pasty blend which is inconvenient to handle and requires long periods of milling or kneading to incorporate the plasticizer with the polymer. When the plasticized polymer is heated, it fuses and blends with the plasticizer slowly and with difficulty. Sheets prepared from the fused, plasticized polymer generally contain a number of relatively large, translucent, inhomogeneous spots, commonly called fish eyes.

In carrying out processes for polymerizing vinyl chloride in accordance with our invention, the conventional aqueous suspension polymerization procedures are modified to carry out the polymerization in a tumbling mill type reactor containing bodies of solid inert material. Such tumbling mill type reactor has a chamber which is tumbled or rotated while the reaction mixture is being processed therein in the presence of solid bodies, commonly in the form of balls, pebbles or rods. These bodies are suitably made of stainless steel, Monel metal or a ceramic, such as porcelain. When using a horizontally rotating mill it is desirable it be equipped with flights to increase the milling action during the polymerization.

Our method of operation not only gives effective agitation of the reaction mixture. The solid bodies have a direct action on the particles of vinyl chloride dispersed in the aqueous medium and undergoing polymerization reaction, which affects the character of the resulting polymer product over and above that resulting merely from agitation of the polymerization mixture. It is believed the solid bodies squash or explode the particles of polymerizing vinyl chloride while they are passing through the viscous or semi-polymerized state. Whatever the explanation for the effect of the mill on the polymerizing material, the action of the solid bodies is to produce a polyvinyl chloride product composed of irregular, fluffy particles of high surface area. They form with the water present a paste-like mixture instead of the usual slurry of dense, hard, granular particles produced by the conventional suspension polymerization of vinyl chloride. When the product of our process is separated from the mother liquor present and washed with water, impurities present are more effectively removed by the wash water than from the granular product produced by conventional suspension polymerization methods. When our washed product is dried, a fluffy powder is obtained. This readily mixes and fuses with plasticizers more quickly than the conventional granular polyvinyl chloride. When fused and sheeted, the plasticized polymer produces clear sheets free from or substantially free from fish eyes. Further, because of the shorter time at elevated temperatures required for incorporating the plasticizer with the polymer, the products made from polyvinyl chloride prepared by our method have better color stability.

As is well known, the grinding action of a tumbling mill is dependent upon several factors, including size and material of which the solid bodies are made, the volume relationship of the grinding material and the space in the mill chamber, and the rate of rotation of the mill. These factors similarly affect the results obtained in employing the tumbling mill reactor for polymerizing polyvinyl chloride in accordance with our invention. Furthermore, we have found best results are obtained when the vinyl chloride dispersion contains more than 1.5 parts by weight water to every one part vinyl chloride. A suitable range in carrying out our invention is about 2/1 to about 5/1 ratio by weight of water to vinyl chloride.

The following examples more particularly illustrate and describe the processes to which this application is directed. They illustrate the effect of different grinding materials and amounts charged to the reactor.

*Example 1.*—The following recipe (in parts by weight) was employed for polymerizing vinyl chloride:

| | Parts |
|---|---|
| Water | 200 |
| Polyvinyl alcohol | 0.5 |
| Benzoyl peroxide | 0.5 |
| Vinyl chloride | 100 |

The distilled water and polyvinyl alcohol were placed in a one-pint stainless steel bomb and frozen. The benzoyl peroxide was added, together with 230 parts by weight of ¼" diameter stainless steel balls. Liquid vinyl chloride was then introduced into the bomb in some excess over the amount given above. The excess vinyl chloride was allowed to boil off to remove air from the bomb. The bomb was then sealed and tumbled end-over-end for 24 hours in a 50° C. water bath. The resulting polyvinyl chloride was filtered off after diluting with water the slurry or paste formed in the reactor, and was washed with water and dried.

The fluffy powder of polyvinyl chloride thus prepared had an apparent density of 0.25, as compared with an apparent density of 0.67 for a polyvinyl chloride prepared by conventional procedure. The product of our process readily mixed with about 50% of its own weight of dioctyl phthalate as plasticizer to produce a dry, free-flowing powder which quickly fused on a hot mill. A sheet formed from the fused, plasticized polymer was clear and had only few fish eyes.

In contrast, when the polyvinyl chloride was prepared by the same procedure described above, except for the steel balls not being present in the bomb, the resulting polyvinyl chloride was in the form of a granular material. When mixed with half its weight of dioctyl phthalate, this granular polyvinyl chloride gave a wet, pasty mixture which fused slowly on the hot mill and gave a sheet containing many translucent, inhomogeneous spots, known as fish eyes.

Reducing the quantity of steel balls in the reactor to 115 parts or increasing it to 345 parts still resulted in polyvinyl chloride products which gave dry, quick-melting mixtures with the plasticizer. Sheets prepared from the plasticized products contained many fewer fish eyes than the product prepared without the grinding material present.

*Example 2.*—The same recipe and procedure given above for Example 1 was employed for polymerizing the vinyl chloride in a one-pint cylindrical bomb of stainless steel rotated about its axis to which 230 parts by weight of ½" diameter porcelain balls were added. The resulting pasty reaction product was slurried with water and filtered to recover the solid polyvinyl chloride separate from the mother liquor. The polymer was washed with water, filtered and dried. It was a fluffy, powder-like polyvinyl chloride product which mixed readily with dioctyl phthalate plasticizer to produce a dry, free-flowing powder. The mixture of plasticizer and polymer fused rapidly on a hot mill and the fused, plasticized material gave clear sheets free from fish eyes.

Using methyl cellulose as dispersant and 0.1 part lauroyl peroxide as catalyst in place of polyvinyl alcohol and benzoyl peroxide in Example 2, polyvinyl chloride products which gave dry mixtures with the plasticizer and more rapid blending were obtained using 614 parts ¼" stainless steel balls, or from 238 to 556 parts of oblong ½" porcelain stones in the reactor. The sheets prepared from the plasticized product contained few fish eyes. Sheets of plasticized polyvinyl chloride prepared in the same manner except for no grinding material present in the reactor contained many fish eyes.

Using the procedure of Example 1, except that 0.5 part methyl cellulose and 0.2 part lauroyl peroxide were substituted for the polyvinyl alcohol and benzoyl peroxide, polyvinyl chloride was obtained which gave semidry mixtures with the plasticizer. These mixtures fused rapidly on a hot mill and produced sheets having no fish eyes. Similar polyvinyl chloride products, forming semi-dry, rapidly fusing mixtures with plasticizer and sheets free of fish eyes were obtained when the following grinding materials were employed in the reactor:

230 parts ⅛" stainless steel balls
175 and 345 parts ¼" stainless steel balls
175 and 230 parts ½" stainless steel balls
1 and 2 Monel metal (trade name "Monel") balls 1" in diameter

We claim:

1. In the preparation of polyvinyl chloride products wherein vinyl chloride is polymerized as a suspension of droplets of the liquid monomer dispersed in an aqueous medium in a closed reaction vessel, that improvement which comprises introducing into said reaction vessel bodies of solid inert material and during the polymerization rotating said reaction vessel and thus effecting a grinding action by said solid bodies on the dispersed particles of vinyl chloride, thereby forming a polyvinyl chloride product of fluffy particles having high surface area and low apparent density, which more readily mixes with and more quickly fuses with plasticizers than a polyvinyl chloride prepared by the same process but without the introduction of said solid bodies into the reaction vessel.

2. The process of claim 1 wherein the vinyl chloride is polymerized in aqueous dispersion containing at least 1.5 parts by weight water to every 1 part vinyl chloride.

3. The process of claim 1 wherein the polyvinyl chloride is blended with a plasticizer and the mixture is fused and sheeted.

4. The process of claim 2 wherein the polyvinyl chloride is blended with a plasticizer and the mixture is fused and sheeted.

References Cited in the file of this patent
UNITED STATES PATENTS

| | | |
|---|---|---|
| 2,479,360 | Howard | Aug. 16, 1949 |
| 2,576,720 | Marks | Nov. 27, 1951 |
| 2,715,117 | Baeyaert | Aug. 9, 1955 |